US012707024B2

(12) United States Patent
Xia et al.

(10) Patent No.: US 12,707,024 B2
(45) Date of Patent: Aug. 11, 2026

(54) METHOD FOR PROCESSING VIDEO CALLS, DEVICE AND STORAGE MEDIUM

(71) Applicant: BIGO TECHNOLOGY PTE. LTD., Mapletree Business City (SG)

(72) Inventors: Yunchang Xia, Guangzhou (CN); Yong Deng, Guangzhou (CN)

(73) Assignee: BIGO TECHNOLOGY PTE. LTD., Mapletree Business City (SG)

(*) Notice: Subject to any disclaimer, the term of this patent is extended or adjusted under 35 U.S.C. 154(b) by 360 days.

(21) Appl. No.: 18/686,968

(22) PCT Filed: Aug. 17, 2022

(86) PCT No.: PCT/CN2022/112959
§ 371 (c)(1),
(2) Date: Sep. 11, 2024

(87) PCT Pub. No.: WO2023/029994
PCT Pub. Date: Mar. 9, 2023

(65) Prior Publication Data

US 2025/0337857 A1 Oct. 30, 2025

(30) Foreign Application Priority Data

Aug. 31, 2021 (CN) ........................ 202111014687.0

(51) Int. Cl.
*H04N 7/14* (2006.01)
*H04L 41/0896* (2022.01)
(Continued)

(52) U.S. Cl.
CPC ......... *H04N 7/147* (2013.01); *H04L 41/0896* (2013.01); *H04L 65/403* (2013.01); *H04N 7/15* (2013.01); *H04N 7/152* (2013.01)

(58) Field of Classification Search
None
See application file for complete search history.

(56) References Cited

U.S. PATENT DOCUMENTS 8,345,083 B2 * 1/2013 Sarkar .................... H04N 7/152 348/14.09
10,582,227 B2 * 3/2020 He ....................... H04N 21/436
(Continued)

FOREIGN PATENT DOCUMENTS

CN 1848958 A 10/2006
CN 101272486 A 9/2008
(Continued)

OTHER PUBLICATIONS

English translation of CN 111107297 A (Year: 2020).*
(Continued)

*Primary Examiner* — Quoc D Tran
(74) *Attorney, Agent, or Firm* — Dilworth & Barrese, LLP.; Michael J. Musella, Esq.

(57) ABSTRACT

Provided is a method for processing video calls. The method includes: determining a layer bit rate corresponding to each frame layer in video data sent by a transmitter, wherein a plurality of video frames in the video data are organized into a plurality of frame layers based on an inter-frame dependency relationship, and the layer bit rate comprises a bit rate acquired by counting bit rates of video frames in a corresponding frame layer; determining, based on uplink bit rates corresponding to a plurality of receivers and a total downlink detected bandwidth, downlink allocated bandwidths corresponding to the receivers; determining, based on the downlink allocated bandwidths corresponding to the receivers and the layer bit rates, target frame layers corresponding to the receivers; and forwarding video data subjected to frame extraction processing for the target frame layers to corresponding receivers.

20 Claims, 5 Drawing Sheets

(51) Int. Cl.
*H04L 65/403* (2022.01)
*H04N 7/15* (2006.01)

(56) References Cited

U.S. PATENT DOCUMENTS

| | | | | |
|---|---|---|---|---|
| 2003/0195977 | A1 | 10/2003 | Liu et al. | |
| 2012/0050457 | A1* | 3/2012 | Gu | H04N 19/114 348/E7.077 |
| 2013/0166650 | A1* | 6/2013 | Chen | H04N 19/164 709/204 |
| 2013/0288653 | A1* | 10/2013 | Zhao | H04N 7/147 455/416 |
| 2020/0053141 | A1* | 2/2020 | Zhao | H04L 65/764 |
| 2022/0321625 | A1* | 10/2022 | Zhong | H04N 21/2408 |

FOREIGN PATENT DOCUMENTS

| | | | | | |
|---|---|---|---|---|---|
| CN | 105306385 | A | | 2/2016 | |
| CN | 105357592 | A | | 2/2016 | |
| CN | 105392001 | A | | 3/2016 | |
| CN | 105681793 | A | | 6/2016 | |
| CN | 105791260 | A | | 7/2016 | |
| CN | 111107297 | A | * | 5/2020 | H04N 7/141 |
| CN | 113038128 | A | * | 6/2021 | H04N 19/172 |
| CN | 113747102 | A | | 12/2021 | |
| EP | 3244585 | A1 | | 11/2017 | |

OTHER PUBLICATIONS

English translation of CN 113038128 A (Year: 2021).*

Xi et al.; "Macroblock Layer Rate Control Algorithm Based on H.264"; j. cnki. catvtec. (2007) 42-45.

* cited by examiner

METHOD FOR PROCESSING VIDEO CALLS, DEVICE AND STORAGE MEDIUM

CROSS-REFERENCE TO RELATED APPLICATIONS

This application is a U.S. national stage of international application No. PCT/CN2022/112959, filed on Aug. 17, 2022, which claims priority to Chinese Patent Application No. 202111014687.0, filed on Aug. 31, 2021, the disclosure of which are herein incorporated by reference in their entireties.

TECHNICAL FIELD

Embodiments of the present disclosure relate to the field of video call technologies, such as a method for processing video calls, and a device and a storage medium thereof.

BACKGROUND

With the development of streaming media technologies and the popularity of smart terminal devices, multi-person video application scenarios become more and more common, and communication between people becomes more and more convenient due to multi-person video conferencing, multi-person video chatting and the like. However, due to a plurality of instable factors of the network, when a user network environment deteriorates, abnormal situations such as delaying, lagging or halting may be caused, which affect normal video calls and lead to deteriorated user experience.

SUMMARY

Embodiments of the present disclosure provide a method for processing video calls, and a device and a storage medium thereof.

According to some embodiments of the present disclosure, a method for processing video calls is provided. The method includes:

- determining a layer bit rate corresponding to each frame layer in video data sent by a transmitter, wherein a plurality of video frames in the video data are organized into a plurality of frame layers based on an inter-frame dependency relationship, and the layer bit rate includes a bit rate acquired by counting bit rates of video frames in a corresponding frame layer;
- determining, based on uplink bit rates corresponding to a plurality of receivers and a total downlink detected bandwidth, downlink allocated bandwidths corresponding to the receivers;
- determining, based on the downlink allocated bandwidths corresponding to the receivers and the layer bit rates, target frame layers corresponding to the receivers; and
- forwarding video data subjected to frame extraction processing for the target frame layers to corresponding receivers.

According to some embodiments of the present disclosure, a computer device for processing video calls is provided. The computer device includes a memory, a processor and a computer program stored in the memory and executable on the processor. The processor, when loading and running the computer program, is caused to perform the method for processing video calls as defined in above embodiments of the present disclosure.

According to some embodiments of the present disclosure, a non-transitory computer-readable storage medium is provided. A computer program in the non-transitory computer-readable storage medium, when loaded and run by a processor, causes the processor to perform the method for processing video calls as defined in the above embodiments of the present disclosure.

DETAILED DESCRIPTION

In a one-to-one video call scenario, a server is capable of adopting a transparent transmission architecture as a peer terminal is unique, such that a bandwidth detection algorithm is able to sense limited bandwidths of both terminals at the same time, thereby directly adjusting a terminal side encoding amount. However, in the multi-person video call scenario, due to the variable number of peer terminals, network conditions of a plurality of peer terminals may be different. It is difficult for the server in the related art to forward video frames reasonably, and this issue needs to be addressed.

Figure 1:
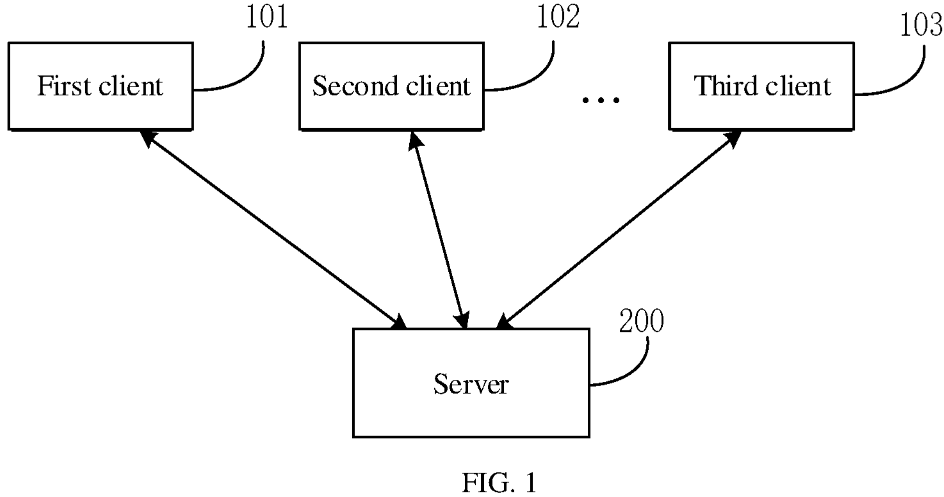
FIG. 1 is a scenario architecture diagram of an application scenario to which a method for processing video calls according to some embodiments of the present disclosure is applicable.

FIG. 1 is a scenario architecture diagram of an application scenario to which a method for processing video calls according to some embodiments of the present disclosure is applicable. The application scenario is a multi-person video call scenario. For example, the multi-person video call includes a multi-person video conference, a multi-person video chat, and the like. In some embodiments, referring to FIG. 1, the application scenario includes a plurality of clients and a server 200, wherein a specific number of the clients is not limited and the number of the clients is generally greater than or equal to three. For convenience of explanation, only three clients are shown in the figure for schematic explanation, namely, a first client 101, a second client 102 and a third client 103. During the multi-person video call process, any client can be a transmitter or a receiver. Taking a case that the first client 101 sends video data as an example, the first client 101 sends local video data to the server 200, and the server 200 forwards the video data to the second client 102 and the third client 103. In this case, the first client 101 is the transmitter, and the second client 102 and the third client 103 are the receivers. Taking a case that the first client 101 receives the video data as an example, the second client 102 and the third client 103 send local video data to the server 200, and the server 200 forwards the two channels of video data to the first client 101. In this case, the second client 102 and the third client 103 are the transmitters and the first client 101 is the receiver. Due to the real-time nature of the multi-person video call, each of the clients is generally both the transmitter and the receiver at the same time, and each video data forwarding corresponds to at least two receivers. In a case that a downlink bandwidth is limited, it is difficult to forward all video frames. In the related art, all of video data to be forwarded to the receivers are subjected to the same frame extraction processing based on a certain frame extraction ratio, but due to different network conditions of different receivers, it is impossible to take into account video call effects of different receivers.

Figure 2:
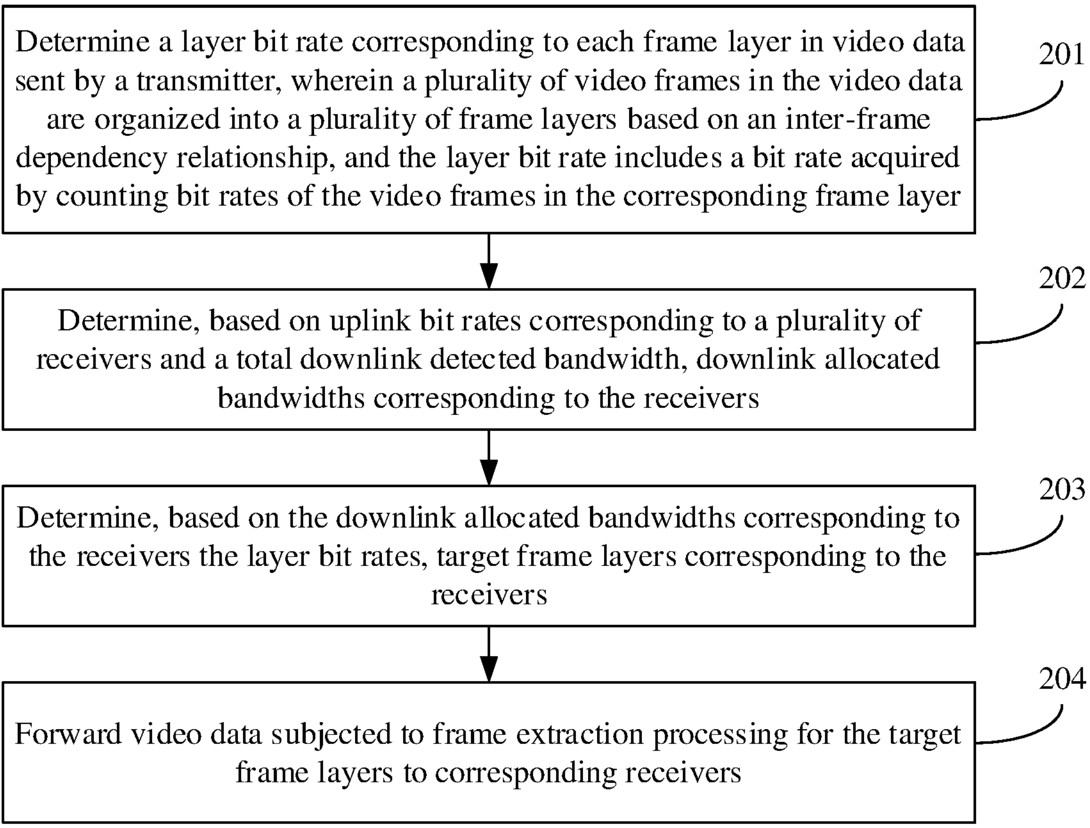
FIG. 2 is a schematic flow diagram of a method for processing video calls according to some embodiments of the present disclosure.

FIG. 2 is a schematic flow diagram of a method for processing video calls according to some embodiments of the present disclosure. In some embodiments, the method is performed by an apparatus for processing video calls, wherein the apparatus is implemented by software and/or hardware, and the apparatus is generally integrated in a computer device such as a server. As shown in FIG. 2, the method includes following processes.

In 201, a layer bit rate corresponding to each frame layer in video data sent by a transmitter is determined, wherein a plurality of video frames in the video data are organized into a plurality of frame layers based on an inter-frame dependency relationship, and the layer bit rate includes a bit rate acquired by counting bit rates of video frames in a corresponding frame layer.

In some embodiments, as mentioned above, each client is generally the transmitter and the receiver at the same time. For convenience of description, uplink video data sent by each client is also referred to as video data sent by the transmitter, that is, the video data here may include a plurality pieces of uplink video stream data, and for example, the video data is sent in the form of data packets. The receiver is understood as a client that needs to receive other video data other than the video data sent by the receiver per se.

In some embodiments, as a difference between adjacent video frames is generally small, compression encoding based on a layer dependency relationship saves an amount of transmitted data. Therefore, in order to ensure timeliness of a video call, the client usually encodes the video data to be sent by compression encoding prior to sending to the server. The video frames in the video data are organized into a plurality of frame layers based on the inter-frame dependency relationship, wherein the inter-frame dependency relationship is understood as a dependency relationship between different video frames, and for example, the inter-frame dependency relationship is determined by an adopted encoding way. The video frames are organized into the frame layers based on the inter-frame dependency relationship. Generally, a group of pictures (GOP) is understood as a group of consecutive pictures of layer dependence. The GOP can be decoded independently, and there is no dependency relationship between the GOPs. At the same time, a first frame of the GOP is usually a key frame (also referred to as frame I) to ensure that the subsequent frames in the GOP are decoded correctly.

Figure 3:
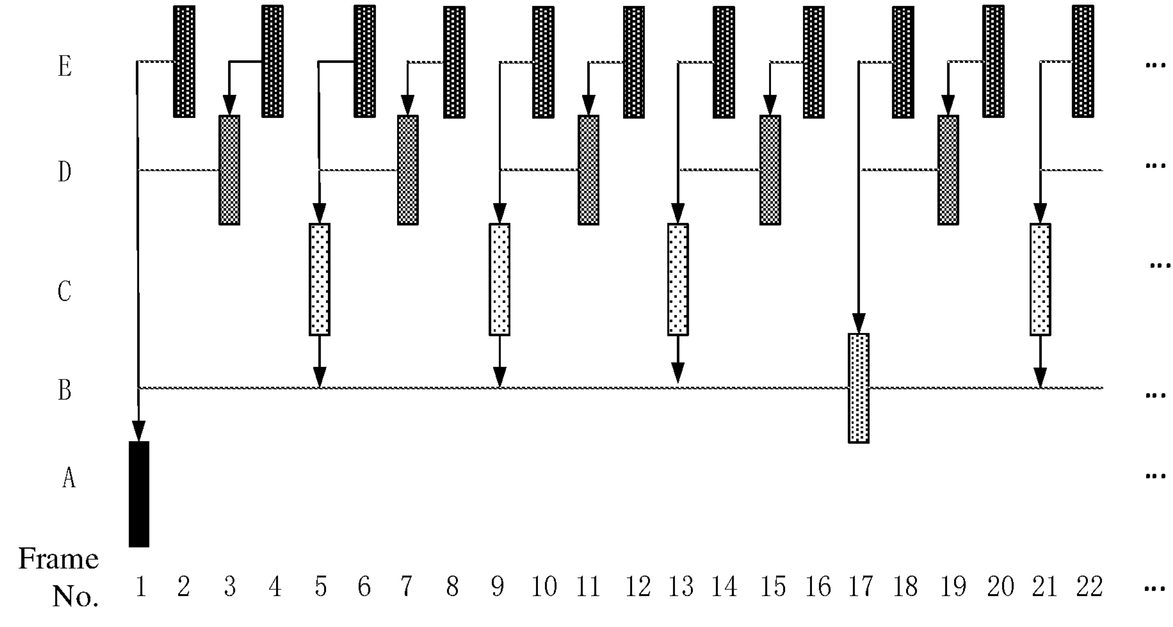
FIG. 3 is a schematic diagram of an inter-frame dependency relationship of video frames according to some embodiments of the present disclosure.

FIG. 3 is a schematic diagram of the inter-frame dependency relationship of the video frames according to some embodiments of the present disclosure. Part of video frames in one GOP are shown in FIG. 3. Based on the inter-frame dependency relationship, these video frames are categorized into five categories, which are marked as A, B, C, D and E respectively. Generally, A is frame K, B needs to depend on A, C needs to depend on B, D needs to depend on C, and E needs to depend on D. It should be noted that the above dependency relationship is only a schematic illustration, and there are other forms of dependency relationships. During categorization, the frame layers can be categorized based on the specific inter-frame dependency relationship and a required division granularity. Taking the inter-frame dependency relationship shown in FIG. 3 as an example, the frame layers are categorized based on different categories. For example, each category corresponds to one frame layer, and the corresponding frame layers are marked as layer a (corresponding to A), layer b (corresponding to B), layer c (corresponding to C), layer d (corresponding to D) and layer e (corresponding to E). For another example, a plurality of categories correspond to one frame layer, and the corresponding frame layers are marked as layer f (corresponding to A), layer g (corresponding to B and C) and layer h (corresponding to D and E).

In some embodiments, levels between the frame layers are determined based on the inter-frame dependency relationship. For example, in response to determining that a first video frame depends on a second video frame, a level of a frame layer to which the second video frame belongs is lower than or equal to a level of a frame layer to which the first video frame belongs. Continuing with the above example, it is considered that a level of the layer a is lower than a level of the layer b, the level of the layer b is lower than a level of the layer c, and so on. Then the layer a has a lowest level and may be also referred to as a bottom layer, and the layer e has a highest level and may be also referred to as a top layer.

In some embodiments, upon receiving uplink data packets, the server distinguishes video packets from non-video packets. The non-video packets include data other than the video frame data, such as audio stream data or file data. For the video data, the statistics of layer bit rates are carried out. The specific statistical way is not limited. For example, the statistical way is solving of an average value or a median value, or the like.

In some embodiments, determining the layer bit rate corresponding to each frame layer in the video data sent by the transmitter includes: determining, for each frame layer in the video data sent by the transmitter, a target statistical window corresponding to a current frame layer, and acquiring a layer bit rate corresponding to the current frame layer by calculating an average bit rate of video frames belonging to the current frame layer falling within the target statistical window. The bit rate of each frame layer is calculated more accurately by counting the average bit rate using a window. For example, the target statistical window is a sliding window.

In some embodiments, a length of the target statistical window is measured by a time length. For example, for a certain frame layer, the layer bit rate is a sum of data amounts of a plurality of video frames in the target statistical window divided by the length of the target statistical window. The lengths of the target statistical window corresponding to different frame layers are the same or different. The length is determined based on the number of video frames that need to be included in some embodiments. For example, the length of the target statistical window is positively proportional to an interval between two adjacent video frames in the corresponding frame layer. A longer window is applied to a base layer frame with a lower frame rate, and stability and rapidity of bit rate statistics are both considered for the top layer frame with a higher frame rate. In addition, for the non-video packets, a shorter statistical window is applied for bit rate statistics in some embodiments.

In 202, based on uplink bit rates corresponding to the receivers and a total downlink detected bandwidth, downlink allocated bandwidths corresponding to the receivers are determined.

In some embodiments, in order to improve a utilization rate of network bandwidth, it is necessary to detect a downlink bandwidth (which is also referred to as bandwidth prediction). In the embodiment of the present disclosure, the specific detection way is not limited, for example, the detection is performed based on indicators such as packet loss, time delay, sending bit rate and receiving bit rate. The detected bandwidth is also referred to as the total downlink detected bandwidth.

In the embodiments of the present disclosure, the statistics of the layer bit rates are performed for a plurality of video streams, and each of the video streams corresponds to one client. For one client, a corresponding uplink bit rate is a sum of a plurality of layer bit rates plus bit rates of the non-video packets.

Upon acquiring the total downlink detected bandwidth and the uplink bit rates corresponding to the receivers, a downlink bandwidth resource that can be occupied by the receivers is allocated, that is, downlink allocated bandwidths corresponding to the receivers are determined. The specific allocation way is not limited. For example, equal proportion allocation is performed based on the uplink bit rates, that is, a proportion of each of the uplink bit rates in the sum of uplink bit rates is calculated, and the corresponding downlink allocated bandwidth is acquired by multiplying the proportion by the total downlink detected bandwidth. For another example, equivalent allocation is performed based on the uplink bit rates, that is, the downlink allocated bandwidth is equal to the uplink bit rate, and at this time, the sum of the uplink bit rates is generally less than or equal to the total downlink detected bandwidth. For yet another example, where the sum of the uplink bit rates is greater than the total downlink detected bandwidth, the bandwidth of the receiver with higher uplink bit rate is limited on the basis of equivalent allocation.

In the implementation process, where it is detected that the sum of the uplink bit rates is less than or equal to the total downlink detected bandwidth, it is generally indicated that the downlink bandwidth resource is relatively sufficient, the downlink bandwidth may not be allocated, or the subsequent frame extraction processing may not be performed, but all the video frames in the video data are forwarded to corresponding receivers.

In 203: based on the downlink allocated bandwidths corresponding to the receivers and the layer bit rates, target frame layers corresponding to the receivers are determined.

In some embodiments, the target frame layer is understood as a frame layer that needs frame extraction processing, and the frame extraction processing is understood as abandoning the forwarding of a certain number of video frames to ensure fluency of the video call. In some embodiments, the corresponding target frame layer is determined for each of the receivers.

Generally, for a frame layer of a lower level, there are more video frames depending on the frame layer. For a frame layer of a higher level, there are less or even no video frames depending on the frame layer. For example, the low-level frame layers of lower levels are preferentially excluded, all the video frames in the low-level frame layers are forwarded, and part or all the other high-level frame layers are selected as the target frame layers.

In some embodiments, for a certain receiver, a boundary between the low-level frame layers and the high-level frame layers is determined based on the layer bit rate corresponding to each of the frame layers in the video data needing to be received by the receiver and the downlink allocated bandwidth corresponding to the receiver. For example, a sum of the layer bit rates corresponding to the low-level frame layer is less than or equal to the downlink allocated bandwidth.

In 204, video data subjected to frame extraction processing for the target frame layers is forwarded to corresponding receivers.

In the embodiment of the present disclosure, the specific frame extraction processing way is not limited, for example, the video frames in the target frame layer are extracted at equal intervals based on a certain frame extraction ratio, or whether a current video frame in the target frame layer needs to be forwarded or extracted (that is, to abandon forwarding) is dynamically decided based on actual network conditions.

It should be noted that where the downlink allocated bandwidth of a certain receiver is equal to the uplink bit rate, it is indicated that the downlink allocated bandwidth of the receiver is relatively sufficient, and the video data to be sent may be directly sent to the receiver without frame extraction processing. That is, in this process, the corresponding receivers include part or all the receivers corresponding to the transmitter, depending on the allocation condition of the downlink bandwidth specifically.

In the video call processing solution according to the embodiment of the present disclosure, the layer bit rate corresponding to each of the frame layers in the video data sent by the transmitter is determined, the downlink allocated bandwidths corresponding to the receivers are determined based on the total downlink detected bandwidth and the uplink bit rates corresponding to the receivers, the target frame layers corresponding to the receivers are determined based on the layer bit rates and the downlink distribution bandwidths corresponding to the receivers, and the video data subjected to frame extraction processing for the target frame layers is forwarded to the corresponding receivers. By adopting the above technical solution, in the multi-person video call scenario, for the video data to be forwarded, the layer bit rate statistics are performed with the frame layer as a unit, the downlink bandwidth is reasonably allocated based on the total downlink detected bandwidth and the uplink bit rate of each of the receivers, and the target frame layers needing frame extraction processing are dynamically determined in combination with the downlink allocated bandwidths and the layer bit rates, such that the frame extraction is performed more reasonably, and a call effect of the multi-person video call is improved.

In some embodiments, forwarding the video data subjected to frame extraction processing for the target frame layer to the corresponding receiver includes: for each receiver of which the downlink allocated bandwidth is less than the uplink bit rate, forwarding video frames of a first frame layer to the receiver, determining video frames to be sent in a corresponding target frame layer based on a predetermined frame extraction strategy, forwarding the video frames to be sent to the receiver, and discarding video frames in the target frame layer other than the video frames to be sent and video frames in a second frame layer, wherein a level of the first frame layer is lower than a level of the corresponding target frame layer, and a level of the second frame layer is higher than a level of the corresponding target frame layer. When the target frame layer is not the topmost layer, video frames of the frame layer below the target frame layer are directly forwarded. As the topmost video frames directly or indirectly depend on the target frame layer, video frames of the frame layer above the target frame layer can be discarded, that is, a whole frame layer is extracted, thereby greatly improving the frame extraction efficiency under the condition of slightly affecting a video picture quality. Discarding the video frames of the second frame layer is understood as prohibiting the forwarding of the video frames of the second frame layer for the current client.

In some embodiments, determining the video frames to be sent in the corresponding target frame layer based on the predetermined frame extraction strategy includes: determining, for a third video frame in the target frame layer corresponding to a first receiver, whether a size of the third video frame is less than or equal to a first threshold of number of bytes corresponding to the first receiver, and determining, based on the size of the third video frame is less than or equal to the first threshold of number of bytes corresponding to the first receiver, the third video frame as the video frame to be sent; wherein the first threshold of number of bytes is determined based on a first type number of bytes corresponding to the first receiver, the first type number of bytes is a dynamically maintained number of bytes, and the first type number of bytes is dynamically reduced based on a size of actual forwarded data corresponding to the first receiver and dynamically increased based on a speed of the downlink allocated bandwidth corresponding to the first receiver, actual forwarded data including video data and non-video data. In this way, the change in the detected bandwidth is quickly tracked and the influence of network fluctuation on the video call effect is reduced.

In some embodiments, the first receiver is any one of the above receivers, and the third video frame is any video frame in the target frame layer corresponding to the first receiver, and the third video frame is understood as the video frame needing to be subjected to frame extraction judgment at present. A concept of a frame extraction bucket is proposed in the embodiment of the present disclosure. A downlink bit rate is made to correctly track the bandwidth by maintaining an available number of bytes in a standard stream control mode. The available number of bytes is consumed along with transmission of the data packets and regularly reverted based on a speed of the downlink bandwidth, and such a structure is also referred to as a frame extraction bucket. The first type number of bytes is understood as a current available number of bytes in the frame extraction bucket, and the first type number of bytes represents an available link resource. In some embodiments, each receiver corresponds to one frame extraction bucket, the threshold of number of bytes is determined based on the first type number of bytes corresponding to the receiver, that is, each receiver corresponds to one threshold of number of bytes, and the threshold of number of bytes corresponding to the first receiver is marked as the first threshold of number of bytes. The first type number of bytes corresponding to the first receiver is dynamically reduced based on the size of the actual forwarded data corresponding to the first receiver (that is, the available number of bytes is consumed along with the transmission of the data packets mentioned above), and the first type number of bytes corresponding to the first receiver is dynamically increased based on the speed of the downlink allocated bandwidth corresponding to the first receiver (that is, equivalent to the regular revert based on the speed of the downlink bandwidth mentioned above). In the case that the size of the third video frame is less than or equal to the first threshold of number of bytes corresponding to the first receiver, it is indicated that the available downlink resource of the first receiver is sufficient to support transmission of the third video frame. Therefore, the third video frame is determined as the video frame to be sent.

For example, where the size of the third video frame is greater than the first threshold of number of bytes corresponding to the first receiver, it is indicated that the available downlink resource of the first receiver is insufficient to support the transmission of the third video frame. Therefore, it is determined that the third video frame is not a video frame to be sent and needs to be extracted, that is, forwarding is abandoned.

In some embodiments, the first type number of bytes corresponding to the first receiver is determined by: acquiring an updated first type number of bytes by subtracting, upon sending first data to the first receiver, a size of the first data from a current first type number of bytes; and determining, upon detecting that a predetermined increase event is triggered, a first time interval between a current moment and last time the predetermined increase event is triggered, determining a first increase number of bytes based on a product of the first time interval and a first target bit rate corresponding to the first receiver, and acquiring the updated first type number of bytes by adding the first increase number of bytes to the current first type number of bytes; wherein the first target bit rate is matched with the downlink allocated bandwidth corresponding to the first receiver. In this way, the numerical value of the first type number of bytes is maintained timely and accurately. The predetermined increase event may be triggered at regular intervals, such as every predetermined time length, wherein the predetermined time length is set based on an actual situation, such as 10 milliseconds or 100 milliseconds, which is generally less than 1 second. The predetermined increase event may be triggered under specified conditions, for example, the predetermined increase event is triggered once every time one data packet is received.

In some embodiments, the first threshold of number of bytes is determined based on a sum of the first type number of bytes corresponding to the first receiver and a second type number of bytes; wherein the second type number of bytes is determined based on a product of a predetermined time window length and the corresponding downlink allocated bandwidth, and the predetermined time window length is determined based on a time series length occupied by video frames depending on a current video frame. In this way, the link resource consumption possibly caused by the video frames needing to be forwarded is fully predicted, and lagging caused by discarding of a large video frame is prevented. In some embodiments, the second type number of bytes is also referred to as a prediction number of bytes, representing data amount allowed to be sent in a period in the future. The predetermined time window length is understood as a length of a prediction time window, wherein the prediction time window is determined by the level of the frame layer, and essentially depends on the time series length occupied by the video frames in the subsequent frame layer of the current frame. As shown in FIG. 3, assuming that the current frame is No. 5 frame, there are No. 6 frame, No. 7 frame and No. 8 frame which depend on No. 5 frame, and the time interval between No. 5 frame and No. 8 frame is regarded as the predetermined time window length. Where the size of No. 5 frame is greater than the corresponding first type number of bytes, it is indicated that the current available downlink resource is insufficient to support the sending of No. 5 frame. However, where No. 5 frame is not sent, even though the subsequent No. 6 frame, No. 7 frame and No. 8 frame become the video frames to be sent along with dynamic change of the first type number of bytes, No. 6 frame, No. 7 frame or No. 8 frame will not be decoded correctly due to the lack of No. 5 frame upon being sent to the corresponding receiver, resulting in lagging. Therefore, it is ensured that No. 5 frame is sent on priority, and the prediction numbers of bytes occupied by No. 6 frame, No. 7 frame and No. 8 frame are taken into account to determine the video frames to be sent.

In some embodiments, determining whether the size of the third video frame is less than or equal to the first threshold of number of bytes and determining, based on the size of the third video frame is less than or equal to the first threshold of number of bytes, the third video frame as the video frame to be sent includes: determining whether the size of the third video frame is less than or equal to the first threshold of number of bytes, determining, based on the size of the third video frame is less than or equal to the first threshold of number of bytes, whether a total size of the video frames to be determined corresponding to the receivers is less than or equal to a total threshold of number of bytes, wherein the third video frame is included in the video frames to be determined, and determining, based on the total size of the video frames to be determined corresponding to the receivers is less than or equal to the total threshold of number of bytes, the third video frame as the video frame to be sent; wherein the total threshold of number of bytes is determined based on a third type number of bytes, and the third type number of bytes is a dynamically maintained number of bytes, wherein the third type number of bytes is dynamically reduced based on a size of actual forwarded data of a server and dynamically increased based on a speed of the total downlink detected bandwidth. In some embodiments, the first threshold of number of bytes is set relatively loose. For example, the available number of bytes maintained in the frame extraction bucket is negative within a certain range, that is, the available number of bytes are overdrawn within a certain range. In this way, in a case that the available downlink resource of a certain receiver is less, a small amount of available downlink resource of other receivers are occupied to better cope with individual network fluctuations. In addition, the total threshold of number of bytes is configured for uniform restriction, such that exceeding the total downlink detected bandwidth is avoided. The third type number of bytes is understood as a current available number of bytes in one total frame extraction bucket. The frame extraction bucket corresponding to each receiver is considered as a sub-bucket, and the total frame extraction bucket is considered as a combined bucket. The sub-bucket is mainly configured to limit the forwarding based on the allocated bandwidth to ensure fairness of a plurality of streams. The combined bucket is mainly configured to uniformly limit an export bit rate to avoid an excessive forwarding phenomenon, which is also understood as preventing the amount of forwarded data from exceeding a carrying capacity of the downlink bandwidth.

In some embodiments, the total threshold of number of bytes is determined based on a sum of the third type number of bytes and a fourth type number of bytes, wherein the fourth type number of bytes is determined based on a sum of the second type numbers of bytes corresponding to the video frames to be determined corresponding to all receivers. In this way, the link resource consumption possibly caused by the video frames needing to be forwarded is fully predicted as a whole, and the lagging caused by discarding a large video frame is prevented.

In some embodiments, determining, based on the uplink bit rates corresponding to the receivers and the total downlink detected bandwidth, the downlink allocated bandwidths corresponding to the receivers includes: making a sum of the downlink allocated bandwidths corresponding to the receivers is equal to the total downlink detected bandwidth by reducing, in response to determining that a sum of the uplink bit rates corresponding to the receivers is greater than the total downlink detected bandwidth, an initial allocated bandwidth corresponding to at least one receiver in a descending order of the uplink bit rates, wherein the initial allocated bandwidth is matched with a value of the corresponding uplink bit rate. In this way, an initial bandwidth allocation is carried out based on the uplink bit rate of the receiver. In the case that the sum of the initial allocated bandwidths exceeds the total downlink detected bandwidth, reduction is performed from the receiver with higher initial allocated bandwidth until the sum of the reduced allocated bandwidths is equal to the total downlink detected bandwidth, thereby improving a utilization rate of the downlink bandwidth on the basis of meeting actual network conditions of the receivers as much as possible.

In some embodiments, making the sum of the downlink allocated bandwidths corresponding to the receivers is equal to the total downlink detected bandwidth by reducing the initial allocated bandwidth corresponding to at least one receiver in the descending order of the uplink bit rates includes: making the sum of the downlink allocated bandwidths corresponding to the receivers is equal to the total downlink detected bandwidth by reducing, by using a water-filling algorithm, the initial allocated bandwidth corresponding to at least one receiver in the descending order of the uplink bit rates.

In some embodiments, determining, based on the downlink allocated bandwidths corresponding to the receivers and the layer bit rates, the target frame layers corresponding to the receivers includes: acquiring an accumulated value of layer bit rate by sequentially accumulating, for each receiver of which the downlink allocated bandwidth is less than the uplink bit rate, the layer bit rates corresponding to the frame layers from the frame layer of a lowest level in a level ascending order, and determining, in response to determining that the accumulated value of layer bit rate is greater than a corresponding downlink allocated bandwidth for the first time, a latest accumulated frame layer as the target frame layer. In this way, the target frame layer is quickly and accurately determined.

Figure 4:
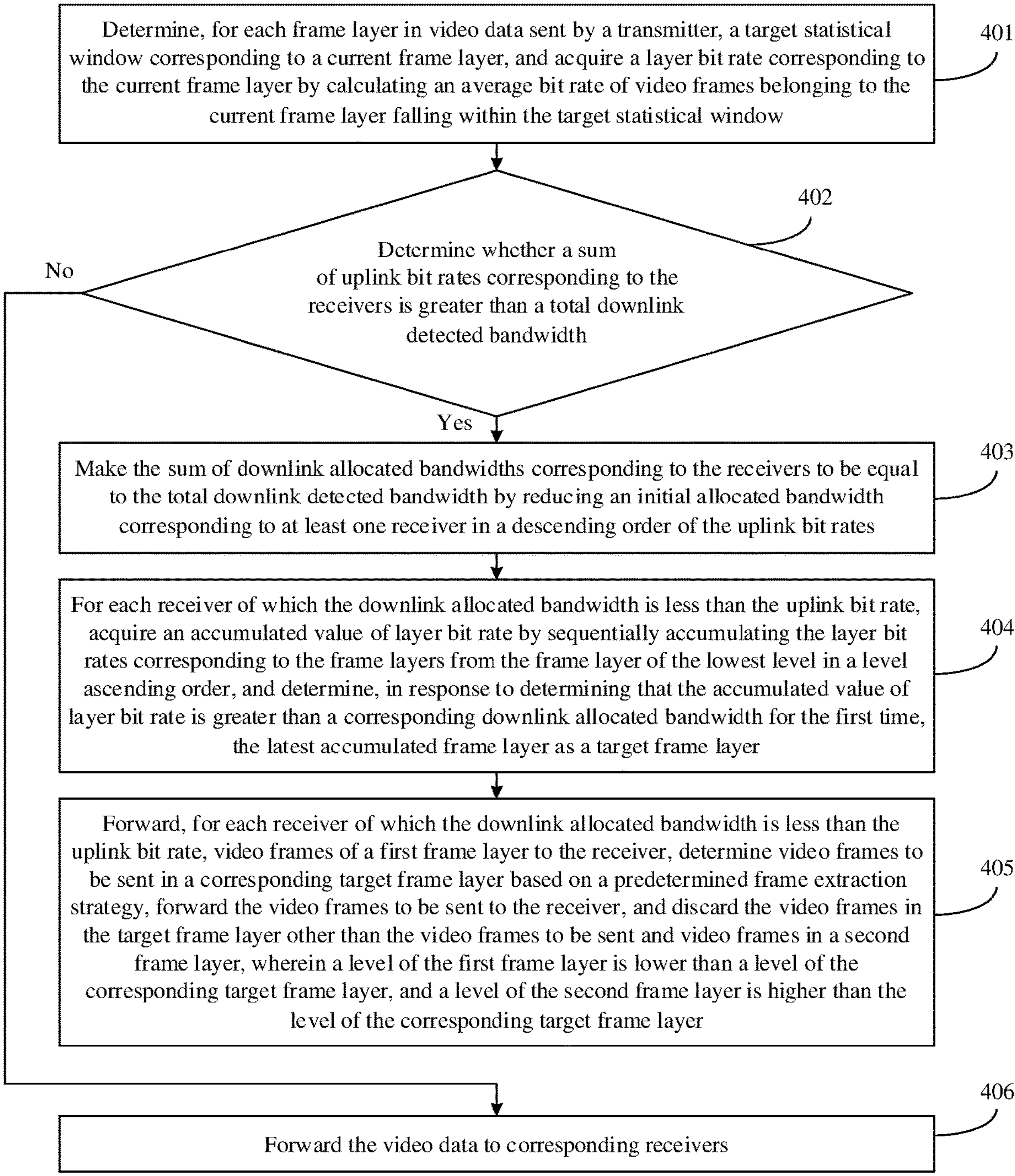
FIG. 4 is a schematic flow diagram of another method for processing video calls according to some embodiments of the present disclosure.
Figure 5:
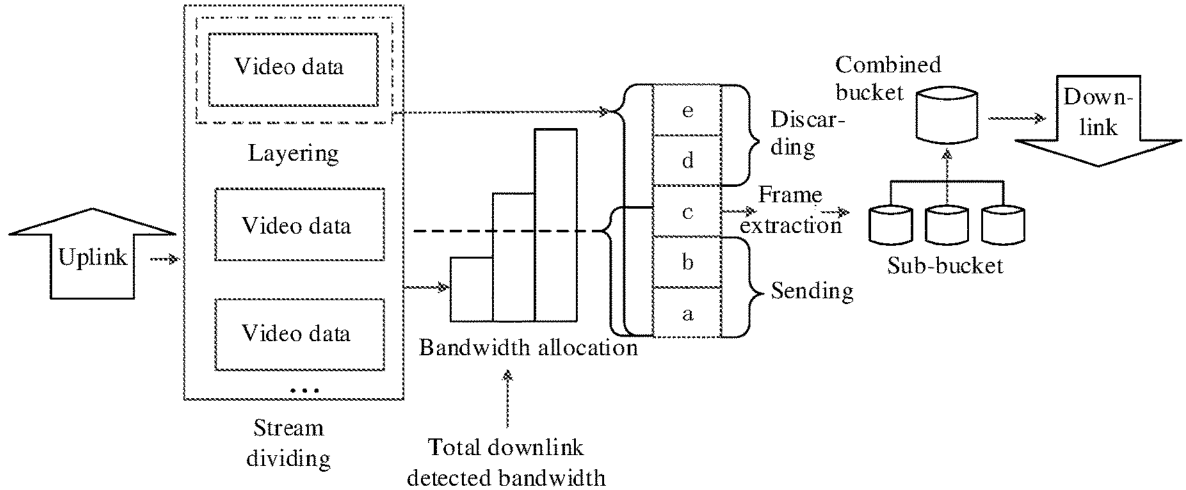
FIG. 5 is a schematic principle diagram of a video call processing process according to some embodiments of the present disclosure.

FIG. 4 is a schematic flow diagram of another method for processing video calls according to some embodiments of the present disclosure, and FIG. 5 is a schematic principle diagram of a video call processing process according to some embodiments of the present disclosure, which is refined on the basis of the above exemplary embodiments. As shown in FIG. 4, the method includes following processes.

In 401: for each frame layer in video data sent by a transmitter, a target statistical window corresponding to a current frame layer is determined, and a layer bit rate corresponding to the current frame layer is acquired by calculating an average bit rate of video frames belonging to the current frame layer falling within the target statistical window.

The video frames in the video data are organized into a plurality of frame layers based on an inter-frame dependency relationship, and a length of the target statistical window is positively proportional to the interval between two adjacent video frames in the corresponding frame layer. As shown in FIG. 3, as in the above example, assuming that five frame layers are organized, and the frame layers are marked as a, b, c, d and e, then the lengths of the corresponding target statistical windows decrease in turn, that is, the length of the target statistical window of layer a is the largest and the length of the target statistical window of layer e is the smallest.

For example, in a condition that the server includes an uplink controller and a downlink controller, this process is performed by the uplink controller, and the uplink controller sends relevant information such as the layer bit rate after statistics to the downlink controller, and other processes are performed by the downlink controllers. In addition, this process is performed by other module such as register, wherein the register is a centralized BitrateRegister in some embodiments. The module is configured to uniformly store the layer bit rate statistical information of a plurality of uplink streams. The information stored in this module is dynamically updated along with the addition, exit and layer bit rate statistical condition of the uplink streams, and the downlink controller actively accesses the module to acquire the layer bit rate information of the uplink streams at the peer terminal. Such a design can avoid repeated forwarding of the uplink statistical information towards a plurality of peer terminal downlink controllers.

In 402, whether a sum of uplink bit rates corresponding to the receivers is greater than a total downlink detected bandwidth is determined, and process 403 is performed based on the sum of the uplink bit rates corresponding to the receivers is greater than the total downlink detected bandwidth; and process 406 is performed based on the sum of the uplink bit rates corresponding to the receivers is less than or equal to the total downlink detected bandwidth.

In some embodiments, a bandwidth detection module is configured in the server, wherein the bandwidth detection module is configured to detect the downlink bandwidth, and acquire the total downlink detected bandwidth upon receiving a detection result of the bandwidth detection module. In the case that the sum of the uplink bit rates corresponding to the receivers is less than or equal to the total downlink detected bandwidth, it is indicated that the bandwidth resource is sufficient and all video frames can be forwarded, that is, there is no need to perform frame extraction processing on the video frames; and in the case that the sum of the uplink bit rates corresponding to the receivers is greater than the total downlink detected bandwidth, bandwidth allocation is performed to ensure the fairness of the receivers.

In 403, the sum of downlink allocated bandwidths corresponding to the receivers is made to be equal to the total downlink detected bandwidth by reducing an initial allocated bandwidth corresponding to at least one receiver in a descending order of the uplink bit rates.

Figure 6:
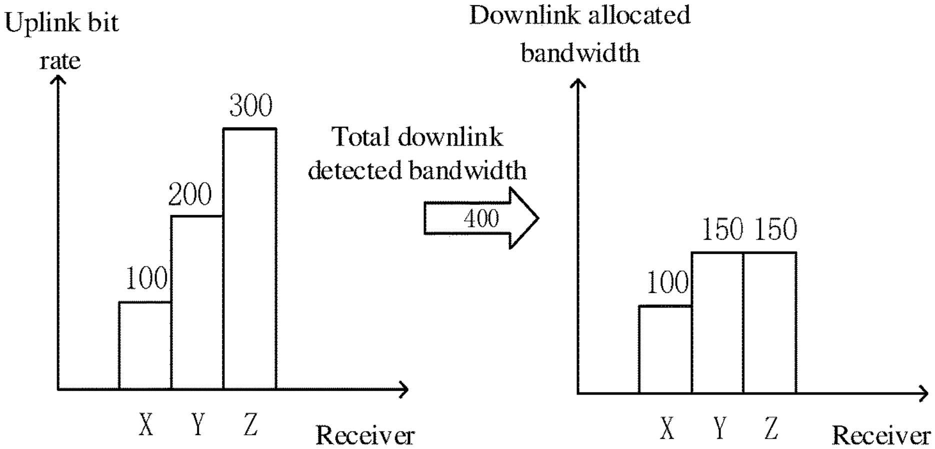
FIG. 6 is a schematic diagram of a bandwidth allocation process according to some embodiments of the present disclosure.

In some embodiments, upon receiving the layer bit rate statistical information, the downlink controller in the server performs bandwidth allocation based on the bit rates of a plurality of uplink streams (that is, the uplink bit rates of the receivers) and the detected bandwidth (that is, the total downlink detected bandwidth). For example, downlink bandwidth allocation is performed by using a waterfilling algorithm. FIG. 6 is a schematic diagram of a bandwidth allocation process according to some embodiments of the present disclosure. Assuming that there are three receivers, which are marked as X, Y and Z, the corresponding uplink bit rates are 100 kbps (kilobits per second), 200 kbps and 300 kbps respectively, and the total downlink detected bandwidth is 400 kbps, then the sum of the uplink bit rates is greater than the total downlink detected bandwidth, and bandwidth allocation is needed. In this case, stream limiting starts from the maximum stream Z. After the stream is limited to 200 kbps, the total bit rate is equal to 100+200+200=500>400 kbps, which still does not meet the bandwidth limit. Therefore, stream Y and stream Z with the parallel largest bit rates are continuously limited to 150 kbps, and then the total bit rate is equal to 100+150+150=400 kbps, which is equal to the target bandwidth, the algorithm is completed, and the bandwidths allocated to X, Y and Z are 100 kbps, 150 kbps and 150 kbps respectively. As a result, stream X is all forwarded, while about 50 kbps and 150 kbps of frame data of high frame layers are extracted from stream Y and stream Z respectively in the subsequent frame extraction link.

In 404, for each receiver of which the downlink allocated bandwidth is less than the uplink bit rate, an accumulated value of layer bit rate is acquired by sequentially accumulating the layer bit rates corresponding to the frame layers from the frame layer of the lowest level in a level ascending order, and in response to determining that the accumulated value of layer bit rate is greater than a corresponding downlink allocated bandwidth for the first time, the latest accumulated frame layer is determined as a target frame layer.

It should be noted that where the downlink allocated bandwidth of a certain receiver is equal to the uplink bit rate, it is not necessary to perform frame extraction processing, that is, process 406 is performed instead of process 404.

In some embodiments, the target frame layer is also referred to as a most basic level or boundary level for starting frame extraction, and the target frame layer is determined by the following expression:

$$\text{level} = \min\left\{N \,\middle|\, \sum_{i=0}^{N} br(i) > BWE\right\}.$$

Level represents the target frame layer, min represents the minimum value, N represents the number of frame layers, i represents the frame layer level, br represents the layer bit rate, and BWE represents the downlink allocated bandwidth.

Figure 7:
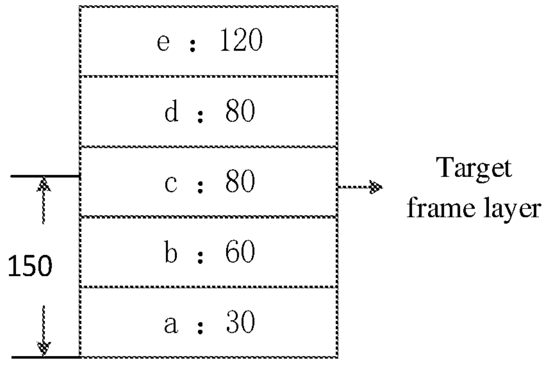
FIG. 7 is a schematic diagram of a target frame layer determination process according to some embodiments of the present disclosure.

FIG. 7 is a schematic diagram of a target frame layer determination process according to some embodiments of the present disclosure. Assuming that the downlink allocated bandwidth is 150 kpbs, the frame layer levels start from 0 to 4, and there are five frame layers in total, which are marked as a, b, c, d and e respectively, the corresponding layer bit rates are 30 kpbs, 60 kpbs, 80 kpbs, 80 kpbs and 120 kpbs respectively. Thus, br(a+b)<BWE<br(a+b+c), and the layer c is the target frame layer.

In 405, for each receiver of which the downlink allocated bandwidth is less than the uplink bit rate, video frames of a first frame layer are forwarded to the receiver, video frames to be sent in a corresponding target frame layer are determined based on a predetermined frame extraction strategy, the video frames to be sent are forwarded to the receiver, and the video frames in the target frame layer other than the video frames to be sent and video frames in a second frame layer are discarded, wherein a level of the first frame layer is lower than a level of the corresponding target frame layer, and a level of the second frame layer is higher than the level of the corresponding target frame layer.

In some embodiments, as shown by the example in FIG. 7, the first frame layer includes the layer a and the layer b, the target frame layer is the layer c, and the second frame layer includes the layer d and the layer e. For the layer a and the layer b, the corresponding video frames are forwarded to the corresponding receivers. For the layer d and the layer e, the forwarding of corresponding video frames is abandoned. For the layer c, whether forwarding is determined frame by frame.

For example, each receiver corresponds to one frame extraction bucket, wherein the frame extraction bucket is considered as a sub-bucket. All the receivers correspond to one total frame extraction bucket, wherein the total frame extraction bucket is considered as a combined bucket. The available number of bytes is dynamically maintained in the frame extraction bucket, and the available number of bytes represents the available link resource. The available number of bytes is reverted based on the speed of the corresponding target bandwidth (wherein the sub-bucket corresponds to the downlink allocated bandwidth, and the combined bucket corresponds to the total downlink detected bandwidth), and the available number of bytes is consumed based on the size of an actual forwarded packet, such that the video stream tracks the target bandwidth. In an ideal state, the reversion and consumption cancel each other out, such that the available number of bytes is close to zero. In this way, the bandwidth resource is effectively utilized and the phenomenon of excessive exceeding is avoided.

In some embodiments, during determining frame by frame, for the video frame that needs to be determined at present, the determinations of the sub-bucket and the combined bucket are performed. The determination basis is simply summarized as: where a frame size is less than or equal to a sum of available number of bytes and prediction number of bytes, the video frame will be forwarded; and where the frame size is greater than the sum of the available number of bytes and the prediction number of bytes, the video frame will be discarded. For the determination of the sub-bucket, the available number of bytes is determined based on the available number of bytes maintained in the sub-bucket. For the determination of the combined bucket, the available number of bytes is determined based on the available number of bytes maintained in the combined bucket. The prediction number of bytes and details of the related determination process are referred to the above and not be repeated.

In 406, the video data is forwarded to corresponding receiver.

In the method for processing video calls according to the embodiments of the present disclosure, the concept of frame extraction bucket is proposed. In the multi-person video call scenario, when the downlink bandwidth resource is insufficient due to poor network environment, the video data forwarding is optimized by combining the two dimensions of stream dividing and layering. By using the available number of bytes dynamically maintained in the frame extraction bucket, the resistance of a server algorithm to fluctuation networks and the rapidity of response are improved without sacrificing the terminal side smoothness. In the scenario of burst limitation, the controller tracks the bandwidth information as soon as receiving the bandwidth information, which reduces excessive adjustment. From the user's point of view, when the network suddenly deteriorates, the video call experience is improved by reducing the delay and shortening the emptying period. The fairness principle of the sub-bucket design ensures that group calls will not be smooth at one terminal and poor at the other. The new frame extraction logic based on the inter-frame dependency relationship considers whether to perform frame extraction with the frame layer as a unit, and determines the target frame layer frame by frame, which is able to extract the most complete frames, avoid the waste of bandwidth resource, and fully predict the link resource consumption possibly caused by the video frames that need to be forwarded, such that the video halting and unbearable delay is avoided to the maximum extent.

Figure 8:
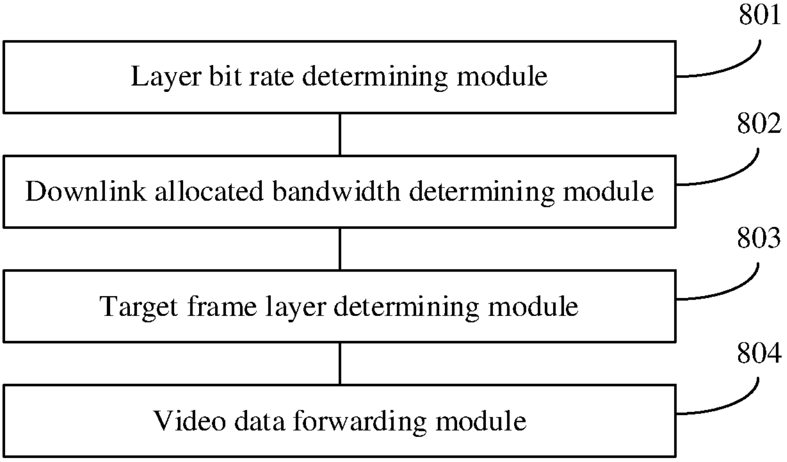
FIG. 8 is a structural block diagram of an apparatus for processing video calls according to some embodiments of the present disclosure.

FIG. 8 is a structural block diagram of an apparatus for processing video calls according to some embodiments of the present disclosure. The apparatus is implemented by software and/or hardware and generally integrated into a computer device. The apparatus performs video call processing by performing the method for processing video calls. As shown in FIG. 8, the apparatus includes:

- a layer bit rate determining module 801, configured to determine a layer bit rate corresponding to each frame layer in video data sent by a transmitter, wherein a plurality of video frames in the video data are organized into a plurality of frame layers based on an inter-frame dependency relationship, and the layer bit rate includes a bit rate acquired by counting bit rates of the video frames in a corresponding frame layer;
- a downlink allocated bandwidth determining module 802, configured to determine, based on uplink bit rates corresponding to a plurality of receivers and a total downlink detected bandwidth, downlink allocated bandwidths corresponding to the receivers;
- a target frame layer determining module 803, configured to determine, based on the downlink allocated bandwidths corresponding to the receivers and the layer bit rates, target frame layers corresponding to the receivers; and
- a video data forwarding module 804, configured to forward video data subjected to frame extraction processing for the target frame layers to corresponding receivers.

For the apparatus for processing video calls according to the embodiments of the present disclosure, the layer bit rate corresponding to each frame layer in the video data sent by the transmitter is determined, the downlink distribution bandwidths corresponding to the receivers are determined based on the uplink bit rates corresponding to the receivers and the total downlink detected bandwidth, the target frame layers corresponding to the receivers are determined based on the layer bit rates and the downlink distribution bandwidths corresponding to the receivers, and the video data subjected to frame extraction processing for the target frame layers is forwarded to the corresponding receivers. By adopting the above technical solution, in the multi-person video call scenario, for the video data to be forwarded, the layer bit rate statistics are performed with the frame layer as a unit, the downlink bandwidth is reasonably allocated based on the total downlink detected bandwidth and the uplink bit rates of the receivers, and the target frame layers needing frame extraction processing are dynamically determined in combination with the downlink allocated bandwidths and the layer bit rates, such that the frame extraction is performed more reasonably, and a call effect of the multi-person video call is improved.

A computer device is provided in the embodiments of the present disclosure, and the apparatus for processing video calls according to the embodiments of the present disclosure is integrated in the computer device in some embodiments.

Figure 9:
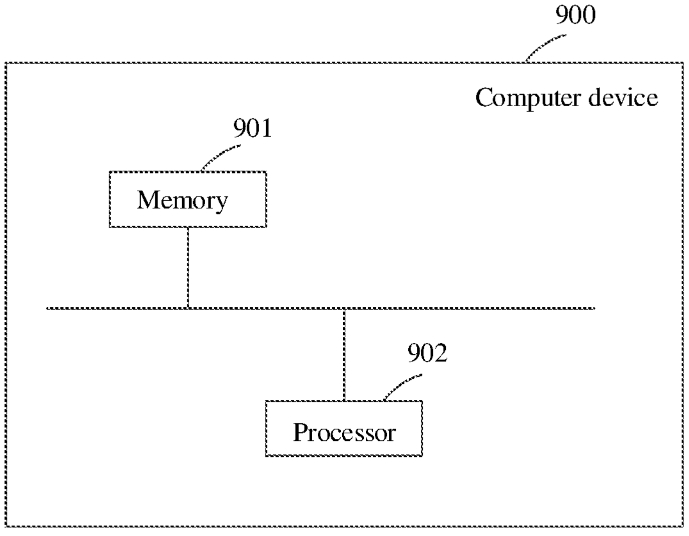
FIG. 9 is a structural block diagram of a computer device according to some embodiments of the present disclosure.

FIG. 9 is a structural block diagram of a computer device according to some embodiments of the present disclosure. The computer device 900 includes a memory 901, a processor 902 and a computer program stored in the memory 901 and executable on the processor 902. The processor 902, when executing the computer program, is caused to perform the method for processing video calls as defined in the embodiments of the present disclosure.

A storage medium is provided in the embodiments of the present disclosure. An computer-executable instruction in the storage medium, when executed by a computer processor, causes the processor to perform the method for processing video calls as defined in the embodiments of the present disclosure. In some embodiments, the storage medium is a non-transitory computer-readable storage medium. For example, the computer-executable instruction is a computer program.

The apparatus for processing video calls, the device and the storage medium according to the above embodiments execute the method for processing video calls as defined in any one of the embodiments of the present disclosure, and have corresponding functional modules for executing the method and beneficial effects. For technical details not described in detail in the above embodiments, please refer to the method for processing video calls according to any one of the embodiments of the present disclosure.

What is claimed is:

1. A method for processing video calls, comprising:

determining a layer bit rate corresponding to each frame layer in video data sent by a transmitter, wherein a plurality of video frames in the video data are organized into a plurality of frame layers based on an inter-frame dependency relationship, and the layer bit rate comprises a bit rate acquired by counting bit rates of video frames in a corresponding frame layer;

determining, based on uplink bit rates corresponding to a plurality of receivers and a total downlink detected bandwidth, downlink allocated bandwidths corresponding to the receivers;

determining, based on the downlink allocated bandwidths corresponding to the receivers and the layer bit rates, target frame layers corresponding to the receivers; and forwarding video data subjected to frame extraction processing for the target frame layers to corresponding receivers.

2. The method according to claim 1, wherein in response to determining that a first video frame depends on a second video frame, a level of a frame layer to which the second video frame belongs is lower than or equal to a level of a frame layer to which the first video frame belongs; and forwarding the video data subjected to frame extraction processing for the target frame layers to corresponding receivers comprises:

for each of the receivers of which the downlink allocated bandwidth is less than the uplink bit rate, forwarding video frames of a first frame layer to the receiver, determining video frames to be sent in a corresponding target frame layer based on a predetermined frame extraction strategy, forwarding the video frames to be sent to the receiver, and discarding video frames in the target frame layer other than the video frames to be sent and video frames in a second frame layer, wherein a level of the first frame layer is lower than a level of the corresponding target frame layer, and a level of the second frame layer is higher than a level of the corresponding target frame layer.

3. The method according to claim 2, wherein determining the video frames to be sent in the corresponding target frame layer based on the predetermined frame extraction strategy comprises:

determining, for a third video frame in the target frame layer corresponding to a first receiver, whether a size of the third video frame is less than or equal to a first threshold of number of bytes corresponding to the first receiver, and determining, based on the size of the third video frame is less than or equal to the first threshold of number of bytes corresponding to the first receiver, the third video frame as the video frame to be sent;

wherein the first threshold of number of bytes is determined based on a first type number of bytes corresponding to the first receiver, the first type number of bytes is a dynamically maintained number of bytes, and the first type number of bytes is dynamically reduced based on a size of actual forwarded data corresponding to the first receiver and dynamically increased based on a speed of the downlink allocated bandwidth corresponding to the first receiver, the actual forwarded data comprising video data and non-video data.

4. The method according to claim 3, wherein the first type number of bytes corresponding to the first receiver is determined by:

acquiring an updated first type number of bytes by subtracting, upon sending first data to the first receiver, a size of the first data from a current first type number of bytes; and determining, upon detecting that a predetermined increase event is triggered, a first time interval between a current moment and last time the predetermined increase event is triggered, determining a first increase number of bytes based on a product of the first time interval and a first target bit rate corresponding to the first receiver, and acquiring the updated first type number of bytes by adding the first increase number of bytes to the current first type number of bytes; wherein the first target bit rate is matched with the downlink allocated bandwidth corresponding to the first receiver.

5. The method according to claim 3, wherein the first threshold of number of bytes is determined based on a sum of the first type number of bytes corresponding to the first receiver and a second type number of bytes; wherein the second type number of bytes is determined based on a product of a predetermined time window length and a corresponding downlink allocated bandwidth, and the predetermined time window length is determined based on a time series length occupied by video frames depending on a current video frame.

6. The method according to claim 3, wherein determining whether the size of the third video frame is less than or equal to the first threshold of number of bytes and determining, based on the size of the third video frame is less than or equal to the first threshold of number of bytes corresponding to the first receiver, the third video frame as the video frame to be sent comprises:

determining whether the size of the third video frame is less than or equal to the first threshold of number of bytes, determining, based on the size of the third video frame is less than or equal to the first threshold of number of bytes corresponding to the first receiver, whether a total size of the video frames to be determined corresponding to the receivers is less than or equal to a total threshold of number of bytes, wherein the third video frame is included in the video frames to be determined, and determining, based on the total size of the video frames to be determined corresponding to the receivers is less than or equal to the total threshold of number of bytes, the third video frame as the video frame to be sent;

wherein the total threshold of number of bytes is determined based on a third type number of bytes, and the third type number of bytes is a dynamically maintained number of bytes, wherein the third type number of bytes is dynamically reduced based on a size of actual forwarded data of a server and dynamically increased based on a speed of the total downlink detected bandwidth.

7. The method according to claim 1, wherein determining the layer bit rate corresponding to each frame layer in video data sent by the transmitter comprises:

determining, for each frame layer in the video data sent by the transmitter, a target statistical window corresponding to a current frame layer, and acquiring a layer bit rate corresponding to the current frame layer by calculating an average bit rate of video frames belonging to the current frame layer falling within the target statistical window.

8. The method according to claim 1, wherein determining, based on the uplink bit rates corresponding to the plurality of receivers and the total downlink detected bandwidth, the downlink allocated bandwidths corresponding to the receivers comprises:

making a sum of downlink allocated bandwidths corresponding to the receivers is equal to the total downlink detected bandwidth by reducing, in response to determining that a sum of the uplink bit rates corresponding to the receivers is greater than the total downlink detected bandwidth, an initial allocated bandwidth corresponding to at least one receiver in a descending order of the uplink bit rates, wherein the initial allocated bandwidth is matched with a value of a corresponding uplink bit rate.

9. The method according to claim 2, wherein determining, based on the downlink allocated bandwidths corresponding to the receivers and the layer bit rates, the target frame layers corresponding to the receivers comprises:

acquiring an accumulated value of layer bit rate by sequentially accumulating, for each receiver of which the downlink allocated bandwidth is less than the uplink bit rate, the layer bit rates corresponding to the frame layers from the frame layer of a lowest level in a level ascending order, and determining, in response to determining that the accumulated value of layer bit rate is greater than a corresponding downlink allocated bandwidth for the first time, a latest accumulated frame layer as the target frame layer.

10. A computer device for processing video calls, comprising a memory, a processor and a computer program stored in the memory and executable on the processor, wherein the processor, when loading and running the computer program, is caused to perform;

determining a layer bit rate corresponding to each frame layer in video data sent by a transmitter, wherein a plurality of video frames in the video data are organized into a plurality of frame layers based on an inter-frame dependency relationship, and the layer bit rate comprises a bit rate acquired by counting bit rates of video frames in a corresponding frame layer;

determining, based on uplink bit rates corresponding to a plurality of receivers and a total downlink detected bandwidth, downlink allocated bandwidths corresponding to the receivers;

determining, based on the downlink allocated bandwidths corresponding to the receivers and the layer bit rates, target frame layers corresponding to the receivers; and forwarding video data subjected to frame extraction processing for the target frame layers to corresponding receivers.

11. A non-transitory computer-readable storage medium, wherein a computer program in the non-transitory computer-readable storage medium, when loaded and run by a processor, causes the processor to perform;

determining a layer bit rate corresponding to each frame layer in video data sent by a transmitter, wherein a plurality of video frames in the video data are organized into a plurality of frame layers based on an inter-frame dependency relationship, and the layer bit rate comprises a bit rate acquired by counting bit rates of video frames in a corresponding frame layer;

determining, based on uplink bit rates corresponding to a plurality of receivers and a total downlink detected bandwidth, downlink allocated bandwidths corresponding to the receivers;

determining, based on the downlink allocated bandwidths corresponding to the receivers and the layer bit rates, target frame layers corresponding to the receivers; and forwarding video data subjected to frame extraction processing for the target frame layers to corresponding receivers.

12. The computer device according to claim 10, wherein a first video frame depends on a second video frame, a level of a frame layer to which the second video frame belongs is lower than or equal to a level of a frame layer to which the first video frame belongs; and the processor, when loading and running the computer program, is caused to perform:

for each of the receivers of which the downlink allocated bandwidth is less than the uplink bit rate, forwarding video frames of a first frame layer to the receiver, determining video frames to be sent in a corresponding target frame layer based on a predetermined frame extraction strategy, forwarding the video frames to be sent to the receiver, and discarding video frames in the target frame layer other than the video frames to be sent and video frames in a second frame layer, wherein a level of the first frame layer is lower than a level of the corresponding target frame layer, and a level of the second frame layer is higher than a level of the corresponding target frame layer.

13. The computer device according to claim 12, wherein the processor, when loading and running the computer program, is caused to perform:

determining, for a third video frame in the target frame layer corresponding to a first receiver, whether a size of the third video frame is less than or equal to a first threshold of number of bytes corresponding to the first receiver, and determining, based on the size of the third video frame is less than or equal to the first threshold of number of bytes corresponding to the first receiver, the third video frame as the video frame to be sent;

wherein the first threshold of number of bytes is determined based on a first type number of bytes corresponding to the first receiver, the first type number of bytes is a dynamically maintained number of bytes, and the first type number of bytes is dynamically reduced based on a size of actual forwarded data corresponding to the first receiver and dynamically increased based on a speed of the downlink allocated bandwidth corresponding to the first receiver, the actual forwarded data comprising video data and non-video data.

14. The computer device according to claim 13, wherein the first type number of bytes corresponding to the first receiver is determined by:

acquiring an updated first type number of bytes by subtracting, upon sending first data to the first receiver, a size of the first data from a current first type number of bytes; and determining, upon detecting that a predetermined increase event is triggered, a first time interval between a current moment and last time the predetermined increase event is triggered, determining a first increase number of bytes based on a product of the first time interval and a first target bit rate corresponding to the first receiver, and acquiring the updated first type number of bytes by adding the first increase number of bytes to the current first type number of bytes; wherein the first target bit rate is matched with the downlink allocated bandwidth corresponding to the first receiver.

15. The computer device according to claim 13, wherein the first threshold of number of bytes is determined based on a sum of the first type number of bytes corresponding to the first receiver and a second type number of bytes; wherein the second type number of bytes is determined based on a product of a predetermined time window length and a corresponding downlink allocated bandwidth, and the predetermined time window length is determined based on a time series length occupied by video frames depending on a current video frame.

16. The computer device according to claim 13, wherein the processor, when loading and running the computer program, is caused to perform:

determining whether the size of the third video frame is less than or equal to the first threshold of number of bytes, determining, based on the size of the third video frame is less than or equal to the first threshold of number of bytes corresponding to the first receiver, whether a total size of the video frames to be determined corresponding to the receivers is less than or equal to a total threshold of number of bytes, wherein the third video frame is included in the video frames to be determined, and determining, based on the total size of the video frames to be determined corresponding to the receivers is less than or equal to the total threshold of number of bytes, the third video frame as the video frame to be sent;

wherein the total threshold of number of bytes is determined based on a third type number of bytes, and the third type number of bytes is a dynamically maintained number of bytes, wherein the third type number of bytes is dynamically reduced based on a size of actual forwarded data of a server and dynamically increased based on a speed of the total downlink detected bandwidth.

17. The computer device according to claim 10, wherein the processor, when loading and running the computer program, is caused to perform:

determining, for each frame layer in the video data sent by the transmitter, a target statistical window corresponding to a current frame layer, and acquiring a layer bit rate corresponding to the current frame layer by calculating an average bit rate of video frames belonging to the current frame layer falling within the target statistical window.

18. The computer device according to claim 10, wherein the processor, when loading and running the computer program, is caused to perform:

making a sum of downlink allocated bandwidths corresponding to the receivers is equal to the total downlink detected bandwidth by reducing, in response to determining that a sum of the uplink bit rates corresponding to the receivers is greater than the total downlink detected bandwidth, an initial allocated bandwidth corresponding to at least one receiver in a descending order of the uplink bit rates, wherein the initial allocated bandwidth is matched with a value of a corresponding uplink bit rate.

19. The computer device according to claim 12, wherein the processor, when loading and running the computer program, is caused to perform:

acquiring an accumulated value of layer bit rate by sequentially accumulating, for each receiver of which the downlink allocated bandwidth is less than the uplink bit rate, the layer bit rates corresponding to the frame layers from the frame layer of a lowest level in a level ascending order, and determining, in response to determining that the accumulated value of layer bit rate is greater than a corresponding downlink allocated bandwidth for the first time, a latest accumulated frame layer as the target frame layer.

20. The non-transitory computer-readable storage medium according to claim 11, wherein a first video frame depends on a second video frame, a level of a frame layer to which the second video frame belongs is lower than or equal to a level of a frame layer to which the first video frame belongs; and the computer program in the non-transitory computer-readable storage medium, when loaded and run by a processor, causes the processor to perform:

for each of the receivers of which the downlink allocated bandwidth is less than the uplink bit rate, forwarding video frames of a first frame layer to the receiver, determining video frames to be sent in a corresponding target frame layer based on a predetermined frame extraction strategy, forwarding the video frames to be sent to the receiver, and discarding video frames in the target frame layer other than the video frames to be sent and video frames in a second frame layer, wherein a level of the first frame layer is lower than a level of the corresponding target frame layer, and a level of the second frame layer is higher than a level of the corresponding target frame layer.

* * * * *